United States Patent
Kulkarni et al.

(10) Patent No.: US 10,891,155 B2
(45) Date of Patent: Jan. 12, 2021

(54) WEARABLE DEVICE TASK OFFLOADING TO CONSERVE PROCESSING RESOURCES

(71) Applicant: McAfee, LLC, Plano, TX (US)

(72) Inventors: Dattatraya Kulkarni, Bangalore (IN); Srikanth Nalluri, Bangalore (IN); Venkatasubrahmanyam Krishnapur, Bangalore (IN); Kaushal Dhruw, Bangalore (IN); Aravind Doss, Bangalore (IN); Raja Sinha, Bangalore (IN); Susmita Nayak, Fremont, CA (US); Yogesh Jain, Cupertino, CA (US)

(73) Assignee: McAfee, LLC, San Jose, CA (US)

( * ) Notice: Subject to any disclaimer, the term of this patent is extended or adjusted under 35 U.S.C. 154(b) by 920 days.

(21) Appl. No.: 15/100,492

(22) PCT Filed: Dec. 23, 2014

(86) PCT No.: PCT/US2014/072237
§ 371 (c)(1),
(2) Date: May 31, 2016

(87) PCT Pub. No.: WO2015/103048
PCT Pub. Date: Jul. 9, 2015

(65) Prior Publication Data
US 2016/0299779 A1    Oct. 13, 2016

(30) Foreign Application Priority Data
Jan. 3, 2014 (IN) .............................. 27/CHE/2014

(51) Int. Cl.
*G06F 9/48* (2006.01)
*H04L 29/06* (2006.01)
(Continued)

(52) U.S. Cl.
CPC ........ *G06F 9/4881* (2013.01); *H04L 63/0492* (2013.01); *H04L 63/0853* (2013.01);
(Continued)

(58) Field of Classification Search
CPC ........ G06F 9/4881; G06F 1/163; H04W 4/80; H04W 4/90; H04W 12/06; H04W 12/003;
(Continued)

(56) References Cited

U.S. PATENT DOCUMENTS 5,987,610 A   11/1999   Franczek et al.
6,073,142 A   6/2000    Geiger et al.
(Continued)

FOREIGN PATENT DOCUMENTS

JP    A-1994139082    5/1994
JP    A-2005503076    1/2005
(Continued)

OTHER PUBLICATIONS

Notice of Reasons for Rejection in JP Application No. 2016-540495, dated Apr. 18, 2017, with English translation, 14 pages.
(Continued)

*Primary Examiner* — Benjamin C Wu
(74) *Attorney, Agent, or Firm* — Patent Capital Group

(57) ABSTRACT

The present disclosure relates to a system and method for providing a service on a wearable device where the wearable device is limited in its functionality in some way when compared with a companion device. In particular, the disclosure describes use cases for configuring the wearable device, and use cases for configuring a wearable device and performing service application functions on the wearable device while leveraging a companion device.

13 Claims, 8 Drawing Sheets

(51) Int. Cl.

| | | |
|---|---|---|
| *H04W 12/06* | (2009.01) | |
| *H04L 29/08* | (2006.01) | |
| *H04W 4/90* | (2018.01) | |
| *H04W 4/80* | (2018.01) | |
| *H04W 12/00* | (2009.01) | |

(52) U.S. Cl.
CPC ............ *H04L 67/10* (2013.01); *H04L 67/322* (2013.01); *H04W 4/80* (2018.02); *H04W 4/90* (2018.02); *H04W 12/003* (2019.01); *H04W 12/06* (2013.01)

(58) Field of Classification Search
CPC ... H04L 67/322; H04L 67/10; H04L 63/0492; H04L 63/0853
See application file for complete search history.

(56) References Cited

U.S. PATENT DOCUMENTS

| | | | |
|---|---|---|---|
| 6,460,050 B1 | 10/2002 | Pace et al. | |
| 6,711,414 B1* | 3/2004 | Lightman | G06Q 30/02 340/853.2 |
| 7,072,354 B1* | 7/2006 | Beathard | H04L 63/10 370/447 |
| 7,506,155 B1 | 3/2009 | Stewart et al. | |
| 9,820,658 B2* | 11/2017 | Tran | A61B 5/0022 |
| 2004/0015973 A1* | 1/2004 | Skovira | G06F 9/4881 718/103 |
| 2010/0112964 A1 | 5/2010 | Yi et al. | |
| 2010/0263032 A1* | 10/2010 | Bhuyan | H04L 63/061 726/7 |
| 2012/0197960 A1* | 8/2012 | An | G06F 15/163 709/201 |
| 2012/0316406 A1 | 12/2012 | Rahman et al. | |
| 2012/0317194 A1 | 12/2012 | Tian | |
| 2012/0331536 A1* | 12/2012 | Chabbewal | G06F 21/33 726/7 |
| 2013/0104198 A1 | 4/2013 | Grim | |
| 2013/0110264 A1 | 5/2013 | Weast et al. | |
| 2013/0262298 A1 | 10/2013 | Morley | |
| 2013/0325396 A1* | 12/2013 | Yuen | A61B 5/222 702/160 |
| 2013/0342457 A1 | 12/2013 | Cox et al. | |
| 2014/0068092 A1* | 3/2014 | Cole | H04W 76/12 709/228 |
| 2014/0143785 A1* | 5/2014 | Mistry | G06F 9/5044 718/104 |
| 2015/0106823 A1* | 4/2015 | Canoy | G06F 9/505 718/105 |
| 2015/0185874 A1* | 7/2015 | Raffa | G06F 3/0346 345/158 |

FOREIGN PATENT DOCUMENTS

| | | |
|---|---|---|
| JP | A-2006243900 | 9/2006 |
| JP | 2010026815 A | 2/2010 |
| KR | 1020040028959 | 4/2004 |
| KR | 2010-0059645 | 6/2010 |
| KR | 2012-0037380 | 4/2012 |
| KR | 20130101975 A | 9/2013 |
| WO | 2011130752 A1 | 10/2011 |
| WO | 2012170051 A2 | 12/2012 |
| WO | WO 2013/163634 A1 | 10/2013 |

OTHER PUBLICATIONS

Akihiko Mizutani et al., "Applications of Short-Range Wireless Communication in Wearable Computers: A Case Study in WatchPad 1.5," FIT (Forum on Information Technology) 2002, Part 4, Japan, Institute of Electronics, Information and Communication Engineers et al., Sep. 13, 2002, pp. 219-220, 3 pages.
KR Aug. 24, 2018 Notice of Allowance from counterpart Korean Application No. 10-2016-7014767 [with English Translation]; 4 pages.
CN Jun. 22, 2018—1st Office Action from Chinese Application 201480066408.7 (No English translation available); 7 pages.
JP May 15, 2018 Decision to Refuse from Japanese Application No. 2016-540495 (No English translation available); 5 pages.
CN Jan. 28, 2019 Second Office Action from counterpart Chinese Application No. 201480066408.7; 3 pages—No English Translation available.
EPO Feb. 13, 2019 Communication regarding counterpart European Application 14876791.6; 4 pages
Japan Office Action from Japanese Application No. 2016-540495, dated Oct. 10, 2017, 13 pages [English translation included].
International Search Report and Written Opinion in International Application No. PCT/US2014/072237, dated Apr. 20, 2015, 14 pages.
Notice of Reasons for Rejection in KR Application No. 2016-7014767, dated Jul. 28, 2017, with English translation, 7 pages.
Extended European Search Report and Opinion from EP Application No. 14876791.6, ddated Aug. 23, 2017, 7 pages.
Office Action in corresponding Korean Patent Application No. 2016-7014767, dated Feb. 21, 2018, with English translation, 14 pages.
CN Jul. 12, 2019 Notice of Granting Patent from counterpart Chinese Application No. 201480066408.7; 4 pages (with English translation).
EPO Jul. 3, 2019 Communication regarding counterpart European Application 14876791.6; 6 pages.
EPO Nov. 22, 2019 Communication regarding counterpart European Application 14876791.6; 5 pages.
Fletcher, G., et al., "OAuth Use Cases, draft-ietf-oauth-use-cases-03," Internet Engineering Task Force, IETF Internet Draft; Oct. 22, 2012; 24 pages.
EPO Aug. 21, 2020 Intention to Grant from counterpart European Patent Application No. 14876791.6; 5 pages.

* cited by examiner

WEARABLE DEVICE TASK OFFLOADING
TO CONSERVE PROCESSING RESOURCES

PRIORITY DATA

This Application is a National Stage application under 35 U.S.C. 371 of International Application PCT/US14/72237 filed on Dec. 23, 2014 and entitled MECHANISMS FOR CONSERVING RESOURCES OF WEARABLE DEVICES, which claims priority to an Indian Provisional Patent Application Serial No. 27/CHE/2014, filed on Jan. 3, 2014 and entitled MECHANISMS FOR CONFIGURING WEARABLE DEVICES AND LEVERAGE FULL FEATURED PROXY DEVICES IN PROXIMITY TO CONSERVE RESOURCES OF WEARABLE DEVICES BASED ON PRIORITY. The disclosures of the prior applications are considered part of and are incorporated by reference in the disclosure of this application.

TECHNICAL FIELD

This application relates to the field of computing, and more particularly to wearable computing.

BACKGROUND

Wearable computing is an exploding at a rapid pace. Wearable technology is related to both the field of ubiquitous computing and the history and development of wearable computers. Examples of wearable devices include glasses, watches, clothing, accessories, anything wearable on a living being and in some cases devices implantable on a living being. With ubiquitous computing, wearable technology share the vision of interweaving technology into the everyday life, of making technology pervasive and interaction frictionless.

Typically wearable devices have very small form factor, are usually portable, and may include some sensors depending on the typical purpose of the device. Furthermore, wearable devices would normally have low computing power, small battery, limited input capabilities and optionally a small display. There are many types of wearable devices of varying capabilities like communication directly to internet, devices that have telephony (e.g., voice only or voice and video/data) capabilities, Bluetooth, and Near Field Communication (NFC) like technologies.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EMBODIMENTS

Understanding Limitations of Wearables

Figure 1A:
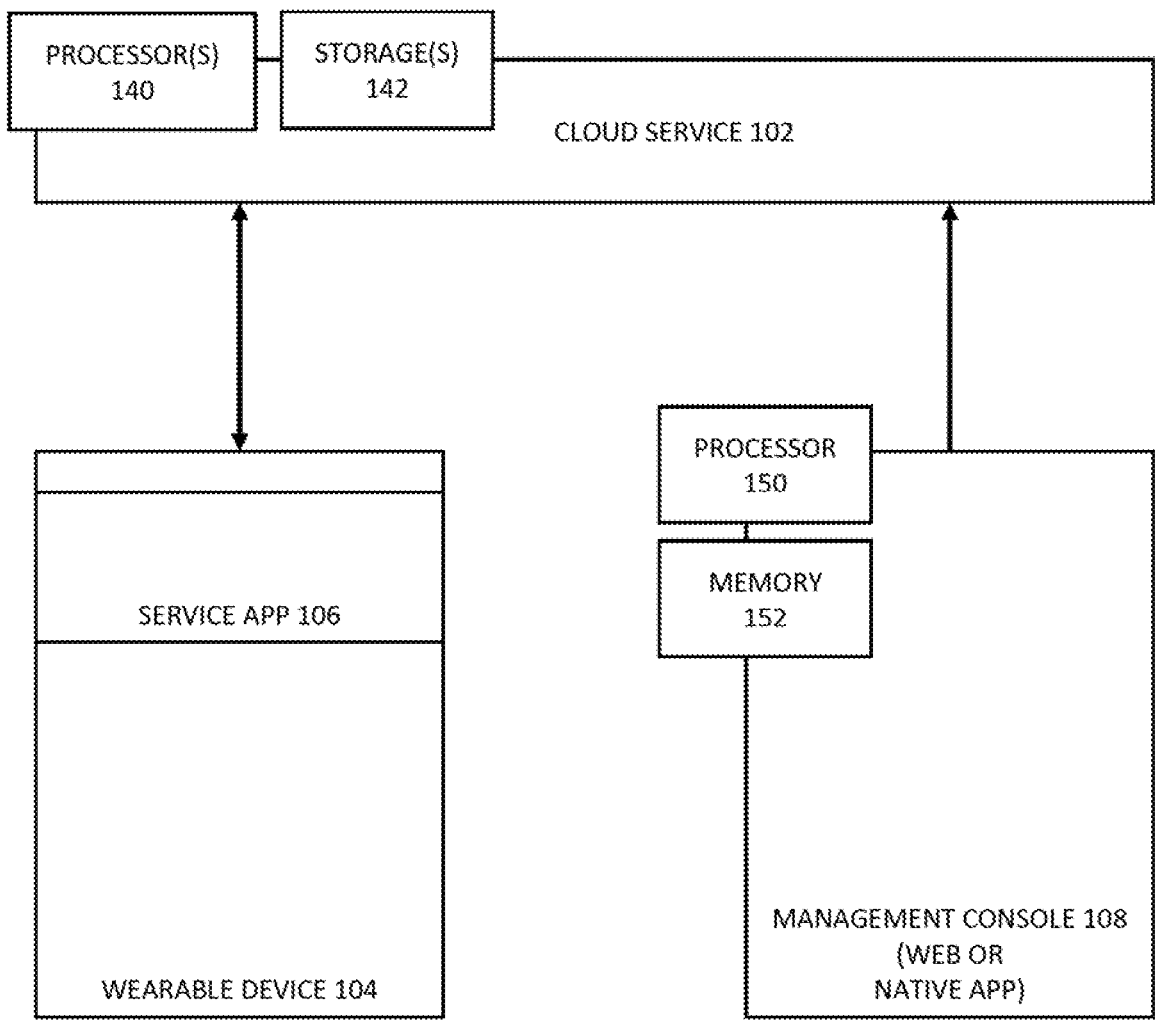
FIG. 1A is a block diagram illustrating a high-level architecture of a wearable scenario, according to some embodiments of the disclosure.

Wearable devices are generally electronic devices which are ubiquitous, pervasive, interactive, and interwoven into everyday lives of its users. As mentioned above, examples of wearables (short for "wearable devices") include glasses, watches, clothing, accessories, and any electronic device wearable on a living being or carried by a living being. In some cases, the electronic device is at least in part implantable on a living being, e.g., healthcare-related electronic devices. In many cases, these wearable devices can be paired with a larger form-factor "host-companion" device such as a smartphone, laptop, tablet, personal computer, etc. The wearable device has one or more of the following characteristics when compared with the host-companion device: fewer computing resources, fewer communication or network resources, fewer power resources (e.g., not connected to a power socket at all times), and fewer user input methods (e.g., no input methods or limited input methods). In some embodiments, examples of wearable devices can include portable electronic devices having limited functionality when compared with a companion device. Generally speaking, the wearable device does not have to be worn or carried by a living being at all times. Within the context of the disclosure, the wearable device is termed "tethered-companion" or while the smartphone is called a "host-companion" or a "companion device".

In general, wearable device designs are constrained by the compute and battery power they can have. Their capabilities are designed to match the resources they have within their form factor limitations, and thus their resources (CPU horsepower, battery and sensors) are usually constrained. For example, smart watches are designed to act only as tethered-companion devices that pair with a smartphone using a low energy link like Bluetooth Low Energy (LE). These devices generally do not have location and other sensors, cellular and cellular data connectivity, thus saving battery requirements, etc. Those devices who have full-fledged functionality suffer from poor performance on compute and battery life. However, there are many potential applications that do need more feature-rich wearable device such as (examples not intended to be limiting, but merely illustrative):

A safety wearable that can alert in case of trouble and provide context information such as location, ambient data like noise, images, etc., to a companion device.

A wearable device that occasionally (such as when a more capable companion device is away) needs to use data connection onboard to receive incoming mail notifications, weather, any useful data, etc.

To provide rich features for the user without suffering from poor performance on compute or battery life, the wearable device can cooperate with the companion device while taking measures to conserve the resources of the wearable device intelligently based on context and/or priority. One challenge to cooperation between the wearable device and the companion device includes providing management mechanisms that allows a wearable device to be securely registered, attached to a service to be managed by a cloud service. The secure registration allows the cooperation to operate in a secured environment. Exemplary management of a wearable includes, among others, operations, registration, attaching the device to an account/subscription of a service, and configuration. Another challenge to cooperation is how resources should be conserved based on context and/or priority.

Overview: Configuration of Wearable Devices

The present disclosure describes systems and methods for securely registering and configuring the wearable device that has no or constrained input methods. For example, a smartwatch has no keyboard (at best a limited keypad) or any other input method to enter registration information like e-mail, etc. One scenario is the wearable is configured (only) via a management console (e.g., a Web application or native application) due to security constraints. The security constraints prevent unauthorized users having possession of the wearable device from changing the configuration of the wearable. Another security aspect is any other person who has knowledge of the protocol and the communication address of the wearable (e.g., phone number) should not be allowed to hijack and configure the wearable device without authorization.

FIG. 1A is a block diagram illustrating a high-level architecture of a wearable scenario, according to some embodiments of the disclosure. The wearable device 104 is provided with a service application 106, wherein the service application 106 is implemented to provide features for the user. For instance, if the wearable is a smart watch, the service application 106 can provide notifications to the user regarding time, weather, emails, text messages, etc. In some cases, the service application 106 can implement procedures that enables secure pairing, registration, and/or communication between the wearable device and a companion device (not shown).

The service application 106 can be communicably connected to a cloud service 102, wherein the cloud service 102 can be implemented to offer a service and/or content to the wearable device. For instance, the cloud service 102 can provide e-mail services, telecommunication services, priority calling services, weather service, notification services, emergency services, etc. The cloud service 102 can be implemented on a server computer, or a computing cluster (having one or more processors 140 and storage elements 142). The cloud service 102 is generally located remotely from the wearable device 104.

The cloud service 102 can manage configuration of wearable devices, e.g., pairing/registration wearable device 104 with a companion device. For instance, the cloud service 102 can maintain user profiles which allows user-based services to be provided to the wearable device and the companion devices. A management console 108 can be provided (e.g., as a web application displayed to a user via a web browser provided by a computing device, or a native application that is executed by processor 150 using instructions stored in memory 152 of the computing device) to allow a user to provide input for enabling (secure) configuration of the wearable device. For instance, the management console can include a user interface for allowing users to select and/or create configurations, and provide any suitable credentials to enable a user to be authenticated and/or authorized. Usually, providing input to such user interface is easier for the user to do than to provide the same input to the wearable device. The management console 108 can be communicably connected to the cloud service 102 over a communication network (e.g., the device on which the management console is provided can be remote from the cloud service). This disclosure further describes multiple ways to configure the wearable securely depending on the device capabilities and application requirements, e.g., as illustrated by FIGS. 2-4.

Figure 1B:
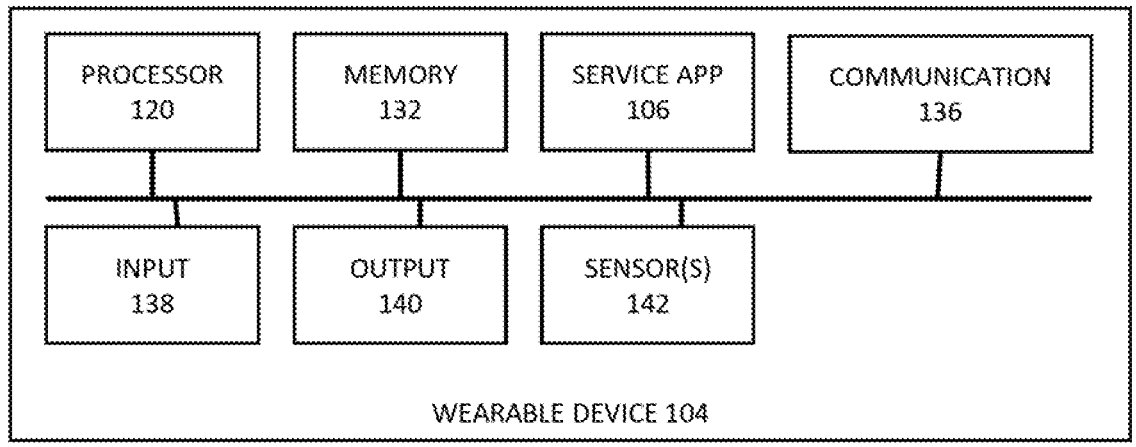
FIG. 1B is a block diagram illustrating a high-level architecture of a wearable device, according to some embodiments of the disclosure.

FIG. 1B is a block diagram illustrating a high-level architecture of a wearable device, according to some embodiments of the disclosure. The wearable device 104 includes one or more processors 120 (e.g., digital signals processor, etc.), one or more memories 132, service application 106, communication interface(s) 136, (optionally) input part 138, (optionally) output part 140, and (optionally) one or more sensors 142. Various parts of the wearable device 104 can be communicably connected with each other over a communication bus or a connectivity fabric/network of wires.

Broadly speaking, the one or more memories 132 is operable to store electronic code, and the one or more processors 120 is operable to execute instructions associated with the electronic code, such that the wearable device is configured to carry out any one or more functions described herein. The communication interface(s) 136 can include a communication stack that allows the wearable device 104 to communicate with one or more companion devices (e.g., using a low energy communication channel, such as Near Field Communication (NFC) channels or Bluetooth Low Energy). In some embodiments, the communication stack can allow the wearable device 104 to communicate with the cloud service 102 (e.g., via the Internet and/or a cellular network). Depending on the wearable, the input part 138 may include one or more user input devices such as an imaging device, gesture sensor, light sensor, microphone, buttons, keypad, touch-sensitive display, scroll wheel/ball, etc. The output part 140 can include one or more user output devices such as an electronic display, haptic output (e.g., vibration, programmable movable surfaces), speaker, etc. The sensor(s) 142 can include one or more sensors such as a capacitive sensor, light sensor, global positioning system sensor, antenna, magnetic sensor, accelerometer, gyroscope, compass, moisture sensor, humidity sensor, pressure sensors, etc.

Figure 2:
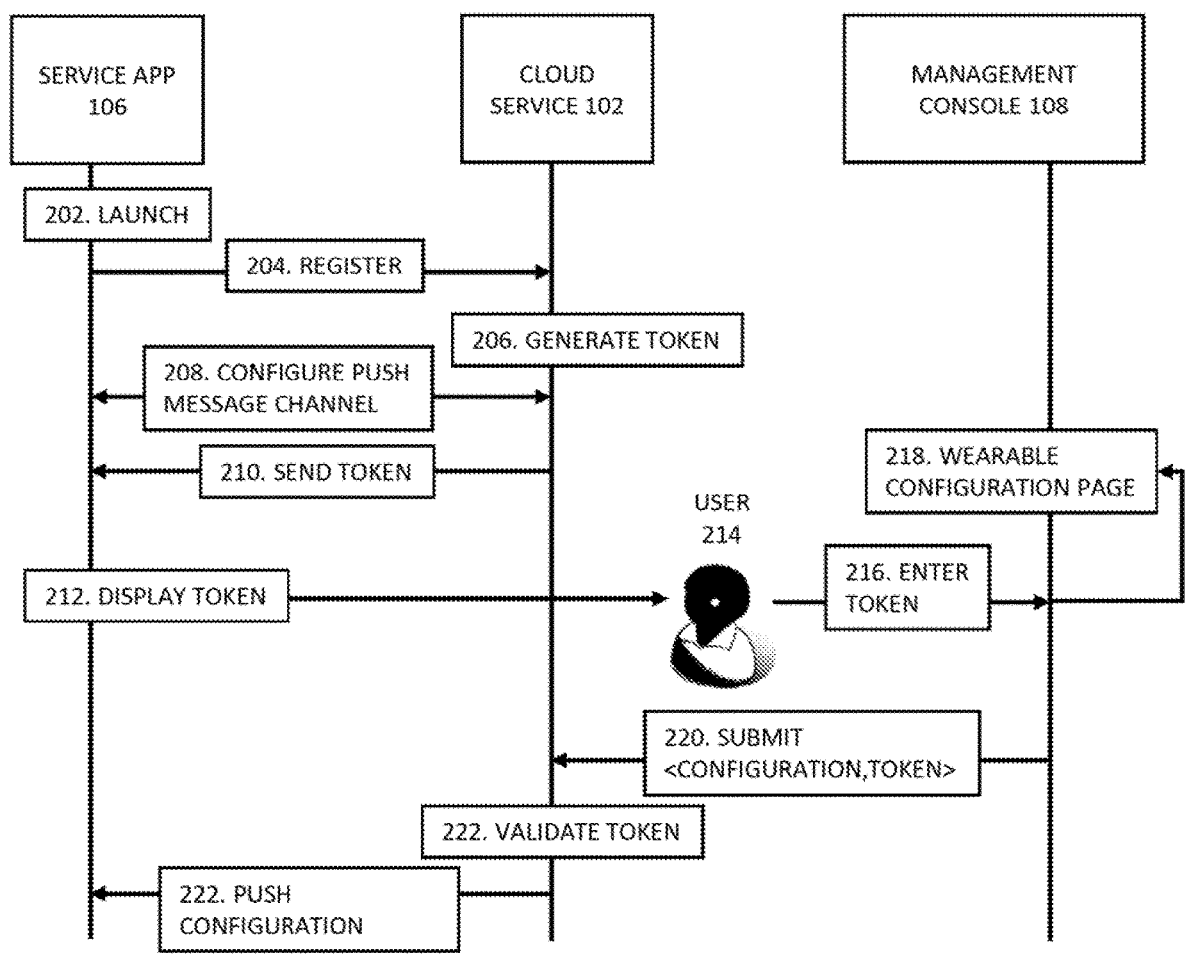
FIG. 2 is a sequence diagram illustrating configuration of a wearable device having no addressable communication mechanism, according to some embodiments of the disclosure.
Figure 3:
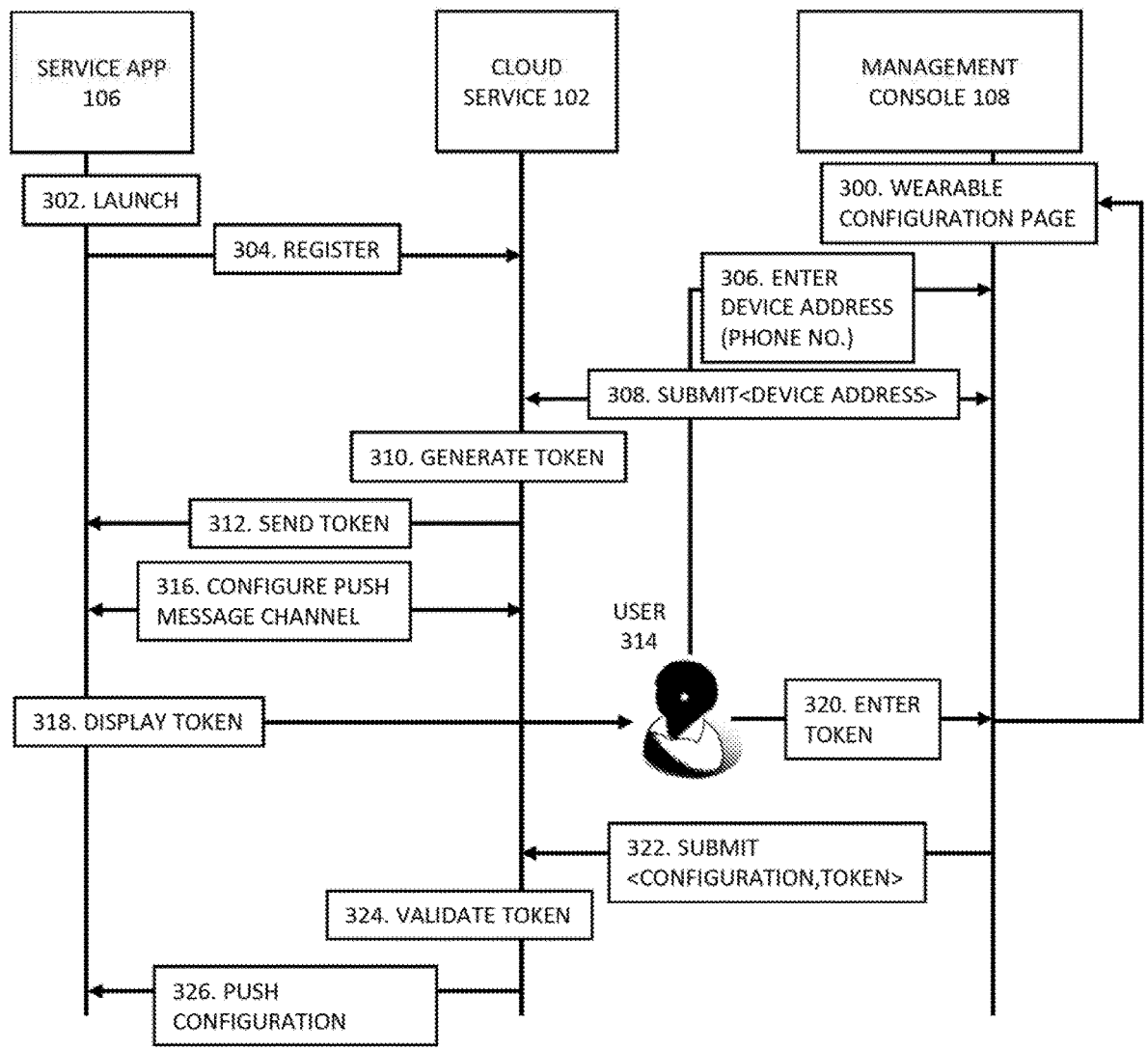
FIG. 3 is a sequence diagram illustrating configuration of a wearable device having direct addressable ID, according to some embodiments of the disclosure.
Figure 4:
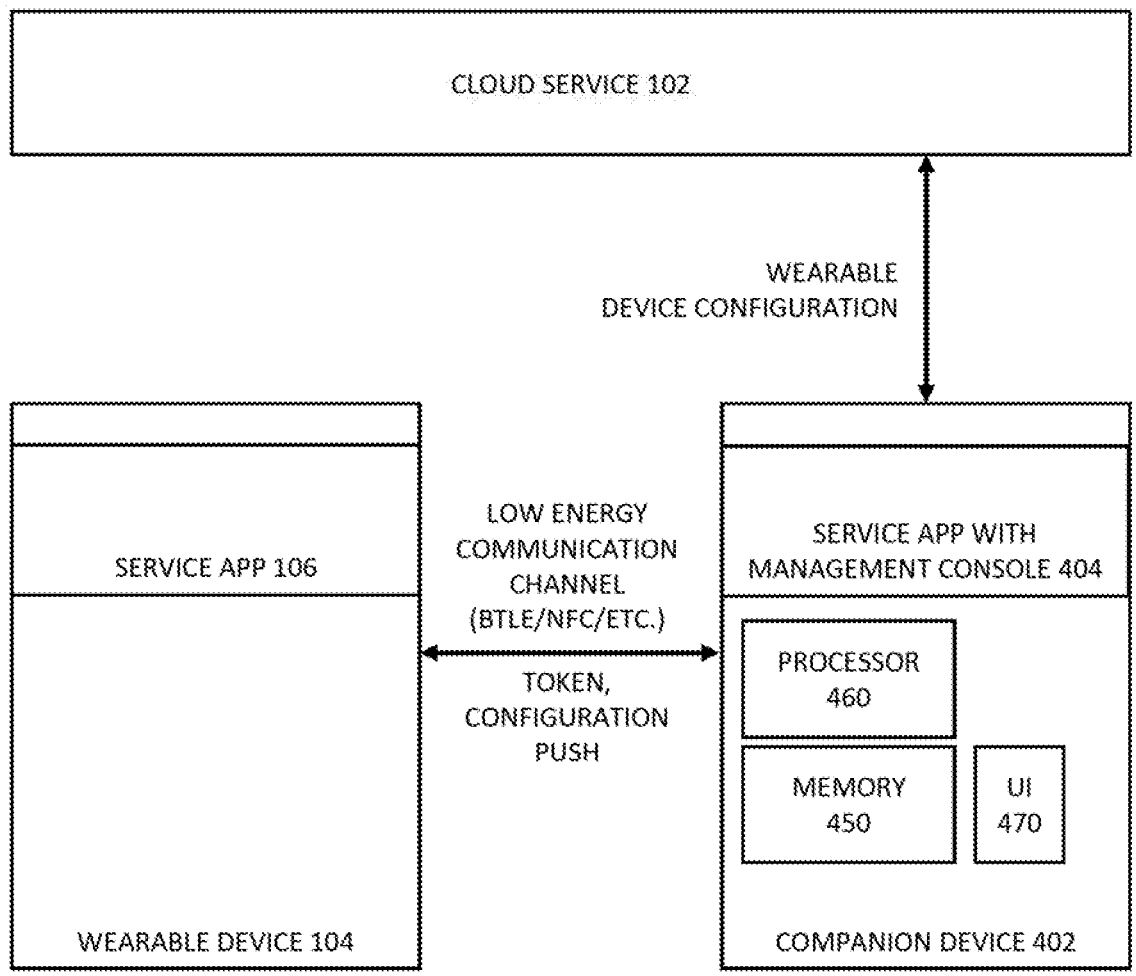
FIG. 4 is a block diagram illustrating using a companion device to configure a wearable device, according to some embodiments of the disclosure.

FIGS. 2-4 illustrates some examples of how a wearable device can be configured, e.g., paired or registered with a companion device (and a cloud service) in a secure manner. This configuration process can setup the wearable device with information, data, and/or program(s) that the wearable device can use to cooperate with its companion device. The wearable device would generally only complete such configuration process if an authenticated/authorized user configures the wearable device with the companion device through a management console. Once configured, the wearable device may be authorized to only communicate with the companion device with which the wearable device is paired or registered, and would not be authorized to communicate with other devices with which the wearable device is not paired or registered. Advantages of the secure configuration include providing the ability to prevent unauthorized users having possession of the wearable device from changing the configuration of the wearable device, preventing person who has knowledge of the protocol and the communication address of the wearable (e.g., phone number) from hijacking and configuring the wearable device without authorization.

Exemplary Configuration: When the Wearable has No Addressable Communication Mechanism In an exemplary scenario, the wearable has no addressable communication mechanism like a phone number through which a command can be sent. Instead, the wearable device can include communication stack like Transmission Control Protocol or Internet Protocol (TCP/IP). The wearable device, e.g., using the service application, can transmit a registration request to a service remote from the wearable device (e.g., cloud service). For instance, a user having the wearable device in his/her possession can provide user input to trigger the wearable device to begin the configuration process and thus triggering the wearable device (e.g., the service application) to transmit the registration request. In response to transmitting the registration request, the service application can receive a token generated by the service over a message channel between the wearable device and the service (e.g., a push message channel), wherein the message channel is mapped to the token, and the token has a limited time to live. Mapping the message channel to the token can advantageously ensure the token is not being transmitted to some other wearable device, or ensure that data being transmitted over the message channel requires validation of the token. Upon receiving the token, the output of the wearable device can output the token to a user. After the user provides the token to a management console (separate from the wearable device) in communication with the service (e.g., cloud service), the service application can receive a message from the service over the message channel indicating that the registration request is complete. Additionally, the service application can receive information, data, and/or programs for configuring the wearable device, e.g., to enable secure pairing/registration of the wearable device with a companion device.

FIG. 2 is a sequence diagram (or messaging diagram) illustrating configuration of a wearable device having no addressable communication mechanism, according to some embodiments of the disclosure. The example illustrates processes carried out by a service application 106, cloud service 102, and management console 108. The service application 106 launches on the wearable device (202). The service application 106 can register itself with the cloud service 102 by transmitting a register request to the cloud service 102, e.g., via the Internet or an intranet (204). The cloud service 102 can generate a unique token that is valid for a limited period of time (e.g., having a limited time to live to advantageously prevent someone else reusing the token at a later time without authorization) (206). The service application 106 of the wearable device and the cloud service 102 can configure a push message channel between each other (allowing the cloud service 102 to push data to the service application 106) and map the push channel to the unique token (208). The cloud service 102 can send the token to the service application 106 of the wearable device over the push message channel (210). The service application 106 can cause the token to be output to the user, e.g., render the token for display on an electronic display of the wearable device (212). User 214 can open a management console 108 and logs into the service account via a wearable configuration page (thus ensuring the user is authenticated and authorized to configure the wearable device) (218). User 214, who has learned the token from the wearable device, can enter the token using the wearable configuration page (216), which advantageously offers confirmation that the authenticated/authorized user has the wearable device in his/her possession. In response, the management console 108 can select/create the configuration for the wearable device (or provide information which can enable the configuration to be created for the wearable device at the cloud service 102) submits it along with the token (220). The cloud service can validate the token received with the token previously generated by the cloud service, and identify the push channel setup previously (222). The cloud service 102 can save/create the configuration for the wearable device identified by the token, and push the configuration to the service application 106 of the wearable device through the push channel set up previously (e.g., the push channel mapped to the same token) (224).

In alternative embodiments, the wearable device (e.g., the service application 106) can receive a registration request from a service remote from the wearable device if the cloud service 102 triggers the configuration process (through a suitable broadcast mechanism). In such a scenario, the cloud service 102 can also generate and transmit the token, e.g., along with the registration request.

The push message channel being configured between the cloud service 102 and the service application 106 may include a companion device in its path, especially if the wearable device does not have the communication stack capable to communicate with the cloud service 102 directly, and/or the resources of the wearable device is to be conserved by leveraging the companion device. In such a scenario, the communications between the cloud service 102 and the service application 106 can be tunneled through the companion device.

Exemplary Configuration: When the Wearable has a Direct Addressable ID

In a variant, the device has a direct addressable communication identifier (ID) such as phone number, Bluetooth Identifier (ID), or Internet Protocol (IP) address, email address, etc. A wearable device, e.g., the service application 106, can receive a token generated by a service remote from the wearable device, e.g., the cloud service, in a text or multimedia message, wherein the token has a limited time to live. The text or multimedia message is transmitted using an identifier of the wearable device (e.g., the direct addressable communication ID). After the message is received, an output of the wearable device can output the token to a user. For instance, the token can be displayed using an electronic display. After the user inputs the token at a management console (separate from the wearable device) in communication with the service, the wearable device can receive a message from the service over a message channel between the wearable device and the service. The message channel is mapped to the token. Mapping the message channel to the token can advantageously ensure the token is not being transmitted to some other wearable device, or ensure that data being transmitted over the message channel requires validation of the token. The message can indicate that the registration request is complete. Additionally, the service application can receive information, data, and/or programs for configuring the wearable device, e.g., to enable secure pairing/registration of the wearable device with a companion device.

FIG. 3 is a sequence diagram (or messaging diagram) illustrating configuration of a wearable device having direct addressable ID, according to some embodiments of the disclosure. The example illustrates processes carried out by a service application 106, cloud service 102, and management console 108. The cloud service 102 may learn of the wearable device having the service application 106. The service application 106 launches on the wearable device (302). The service application 106 can register itself with the cloud service 102 by transmitting a register request (e.g., having the direct addressable ID) to the cloud service 102, e.g., via the Internet, an Intranet, a cellular network, etc. (304). User 314 can open the management console 108 and logs into the service account via a wearable configuration page (thus ensuring the user is authenticated and authorized to configure the wearable device) (300). User 314 can enter the direct addressable ID (e.g., the phone number, or some other direct addressable ID) of the device on the management console 108 via a wearable configuration page (306). The management console 108 can submit or transmit the device address to the cloud service 102 (308). The cloud service 102 can generate the token (310). The cloud service 102 can send/transmit the token to the service application 106 by Short Message Service (SMS) or some other suitable manner (312). Further to transmitting the token, the cloud service 102 can configure a push message channel between the cloud service 102 with service application 106 (allowing the cloud service 102 to push data to the service application 106) and map the push channel to the unique token (316). The service application 106 can cause the token to be output to the user, e.g., render the token for display on an electronic display of the wearable device (318). User 314, who has learned the token from the wearable device, can enter the token using the wearable configuration page (320), which advantageously offers confirmation that the authenticated/authorized user has the wearable device in his/her possession. In response, the management console 108 can select/create the configuration for the wearable device (or provide information which can enable the configuration to be created for the wearable device at the cloud service 102) submits it along with the token (323). In some cases, the management console 108 can further identify the configuration and token by providing the direct addressable ID for validation purposes. The cloud service can validate the token received with the token previously generated by the cloud service, and identify the push channel setup previously (324). The validation can further include validating the direct addressable ID with the identified push channel. The cloud service 102 can save/create the configuration for the wearable device identified by the token, and push the configuration to the service application 106 of the wearable device through the push channel set up previously (e.g., the push channel mapped to the same token) (326).

In alternative embodiments, the cloud service 102 (upon receiving the device address from an authorized/authenticated user), can trigger the configuration process on the wearable device (e.g., the service application 106) by transmitting a register request to the service app 106 using the device address. In some cases, the cloud service 102 can broadcast the request to the service application 106. The cloud service 102 can also provide the token with the register request at that time, if desired, indicating a configuration process is to be carried out.

The push message channel being configured between the cloud service 102 and the service application 106 may include a companion device in its path, especially if the wearable device does not have the communication stack capable to communicate with the cloud service 102 directly, and/or the resources of the wearable device is to be conserved by leveraging the companion device. In such a scenario, the communications between the cloud service 102 and the service application 106 can be tunneled through the companion device.

Exemplary Configuration: Using a Companion Device

In another scenario, a companion device is used to configure the wearable device. The companion device like a smartphone can provide the management console through which the device is configured and the configuration can be pushed through Bluetooth or Near Field Communication (NFC) channel. FIG. 4 is a block diagram illustrating using a companion device to configure a wearable device, according to some embodiments of the disclosure. Both the wearable device 104 and the companion device 402 (e.g., a smart phone or some other suitable computing device) has a service application. The wearable device has service application 106, and the companion device is configured with service application with a management console 404. The companion device 402, can include one or more memories 450 operable to store electronic code, and one or more processors 640 operable to execute instructions associated with the electronic code to implement one or more functions of the companion device 402 described herein. The companion device 402 may communicate with the cloud service 102 to obtain wearable device configurations. The companion device 402 can also push configuration the wearable device through a low energy communication channel between the wearable device and the companion device (e.g., Bluetooth Low Energy, Near Field Communication (NFC), etc.).

In some embodiments, the wearable device 104, e.g., the service application 106, can transmit a registration request to the companion device 402, e.g., the service application with management console 404. In response to transmitting the registration request, the service application with management console 404 can generate a token for the service application 106 of wearable device 104. The service application with management console 106 can transmit the token via a message channel between the wearable device and the companion device, wherein the message channel is mapped to the token, and the token has a limited time to live. The message channel can be provisioned over the low energy communication channel. An output of the wearable device 104 can output the token to a user. After the user provides the token to the service application with management console 404 of the companion device 402 (e.g., via a user interface 470 of companion device 402), the service application with management console 404 can determine whether the token provided by the user is valid against the token previously generated for the wearable device 104. The service application 106 of the wearable device 104 can receive a message from the companion device 402 (e.g., e.g., service application with management console 404) over the message channel indicating that the registration request is complete. Additionally, the service application 106 can receive information, data, and/or programs for configuring the wearable device, e.g., to enable secure pairing/registration of the wearable device with a companion device.

As a security step, the service application with management console 404 can perform authentication/authorization of the user with the assistance of cloud service 102. After the user is authenticated/authorized, the cloud service 102 can provide wearable device configuration to the service application with management console 404. Generally speaking, this scheme can allow a user having possession of both the wearable device 104 and the companion device 402 and having been authenticated/authorized by the cloud service 102 to fetch suitable wearable device configuration from cloud service 102 and/or configure the wearable device 104 to pair the wearable device 104 with companion device 402.

In alternative embodiments, the wearable device (e.g., the service application 106) can receive a registration request from service application with management console 404 if the service application with management console 404 triggers the configuration process (through a suitable broadcast mechanism). In such a scenario, the service application with management console 404 can also generate and transmit the token, e.g., along with the registration request. In some cases, the companion device 402, using the service application with management console 404 can detect that wearable device is 104 nearby and initiates the configuration process.

Token

The token (as used herein) can include a one-time password or string, which can only be used during a limited period of time. The token can be randomly generated to be valid during the limited period of time, or can be generated based on a token generating function or mathematical formula. If the user is authenticated and authorized by the cloud service, the token being generated can be unique to the user. The token (as used herein) can be embodied in text form, audio form, image form, video/animation form. Using non-text forms can further increase the chance of the user being an actual person, and not a computer program trying to hijack the token. For instance, the token (as used herein) can include a series of numbers and/or letters, and the wearable device can output the token via an output part (e.g., electronic display, haptic output, speaker, etc.) so that a user in possession of the wearable device can learn/receive/consume the token. If the token is transmitted to the wearable device using a text or multimedia message and an identifier of the wearable device (e.g., the direct addressable communication ID), the message can include the token as a string, an image having the token, an audio clip that vocalizes the token, etc. In some cases, the token can be delivered using a "robocall", wherein a computer generated voice call can deliver the token to the wearable device and the user in possession of the wearable device via audio.

Overview: Leveraging Full Featured Proxy Devices in Proximity to Conserve Resources of Wearable Device Based on Context and/or Priority This part of disclosure describes the method and system through which the wearable device that have constrained CPU (computer processing unit), sensor and energy resources optimize the resource usage by leveraging companion device. Wearable device has low computing power and energy resources (battery). Due to this although the wearable has full capabilities like sensors, communication capabilities, it is constrained by resources like battery and computing power. It will be of immense help if wearable can leverage the capabilities of a companion device nearby whenever possible to conserve its resources. However, solving the problem is not trivial. In view of one or more of the above-mentioned issues, mechanisms described herein can allow a wearable to have enough resources on board for them to work independently when the wearable is not in proximity with a companion device, and leverage the proximal (full-featured) device if it is available to offload battery consuming tasks (when the wearable is in proximity with the companion device). The embodiments disclosed herein provides for using the onboard resources optimally based on context (e.g., proximity to a companion device) and/or priority (e.g., priority level of a particular task). Generally speaking, the wearable device and the companion device can communicate with each other via a low energy communication link to perform functions such as discovery, implement services involving, e.g., sensor data, use of Internet connectivity, and compute tasks.

In one example use case, the wearable can leverage the Internet access of a smartphone that is nearby (in proximity), to gain Internet access if a wearable itself does not have Internet access. The wearable could also leverage a stronger or faster Internet access (or network connectivity), and/or save battery by using the companion device's Internet access. In another example use case, the wearable can get a more accurate location without compromising on the battery life by using the companion device's global positioning system sensor. In another example use case, the wearable and the companion device are paired for proximity detection. In yet another example use case, a wearable (e.g., a watch) detects when the preconfigured companion device is nearby (in proximity) and switch to companion proxy mode. In this mode, the virtual tunnel to the external work is opened through the companion device. All the communication is done through this tunnel and leveraging the sensors, communication stack and/or CPU of the companion device wherever possible. In another example use case, prioritization of tasks/application activities based on urgency and the ones that can be deferred till the time a companion device is in proximity. High priority task is done using the resources of wearable device if the companion device is not in proximity. In yet a further example use case, other tasks (low priority tasks) are queued and when the (paired/registered/trusted) companion device is in proximity, the queued tasks are performed using the resources of the companion device.

The mechanisms described herein are typically implemented for wearable devices and companion devices which have been configured/paired/registered using the methods described herein (e.g., schemes illustrated in FIGS. 2-4).

Process Flow Based on Context and Priority

One important features of intelligent conservation of resources of the wearable device paired with the companion device is that the wearable device can perform tasks based on context and priority. Within this present disclosure, context can include the state of the wearable device (e.g., available battery life, available compute resources, current processes being executed by the wearable device) and the state of the environment of the wearable device (e.g., time of day, proximity to companion devices, day of the week, temperature, location, etc.). Priority is generally associated with the nature of the task of interest. The wearable device may include a data structure (e.g., stored in memory) which associates different tasks with different priorities. The priorities can be predefined for various types of tasks. In some cases, a task may include metadata which specifies the priority of the task. Priority can be associated with varying levels of urgency and/or importance.

Figure 5:
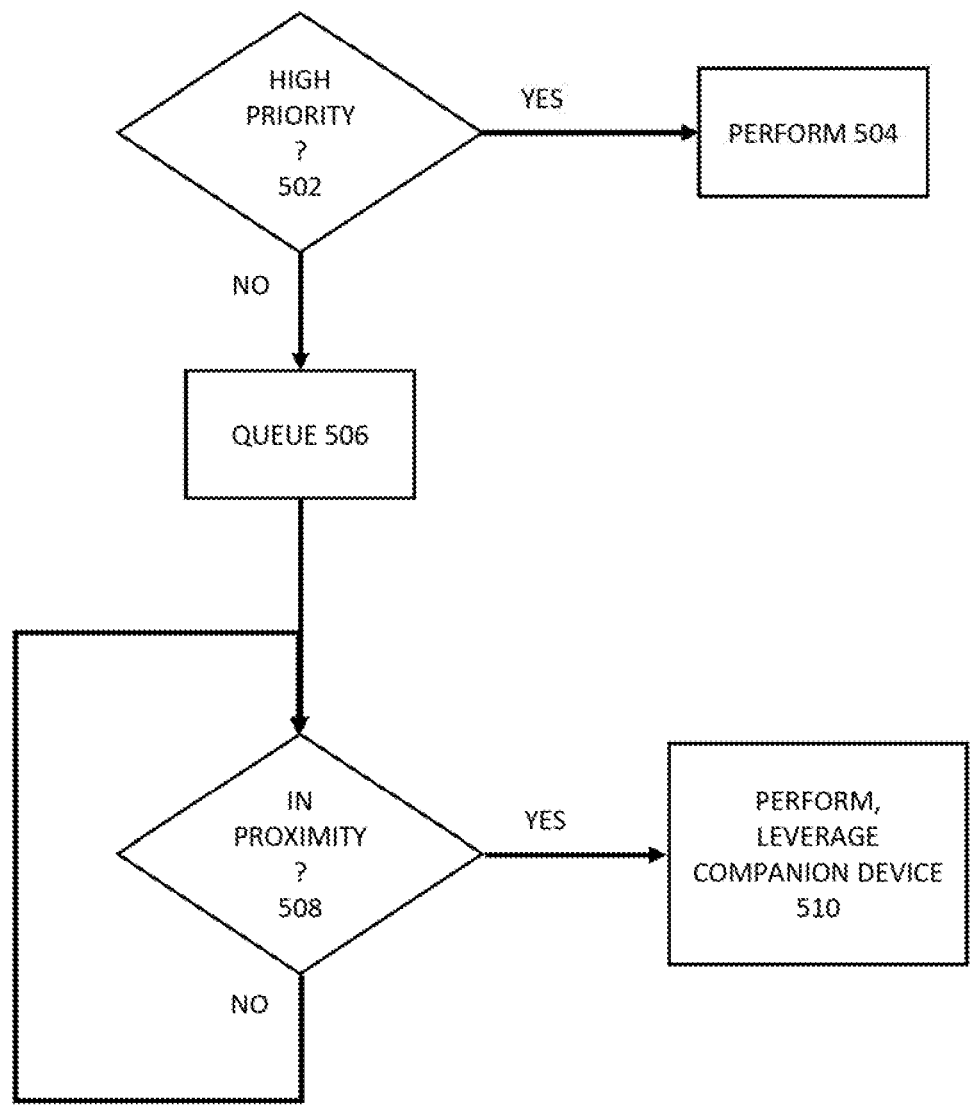
FIG. 5 is a process flow diagram illustrating a wearable device conserving its resources based on context and priority, according to some embodiments of the disclosure.

FIG. 5 is a process flow diagram illustrating a wearable device conserving its resources based on context and priority, according to some embodiments of the disclosure. The example show is merely for illustration, it is understood by one skilled in the art that other suitable process flows can be prescribed based on different contexts/priorities. The illustrative example shows the wearable device checking whether a task is of high priority (502). If yes, the wearable device performs the task (504). If no, the wearable device queues the task (506). The illustrative example further shows the wearable device checking whether the companion device is in proximity to the wearable device (508). If yes, the wearable device performs the task while leveraging the resources of the companion device (510). If no, the wearable device continues to defer the performance of the first task and waits until the companion device is in proximity to the wearable device.

Figure 6:
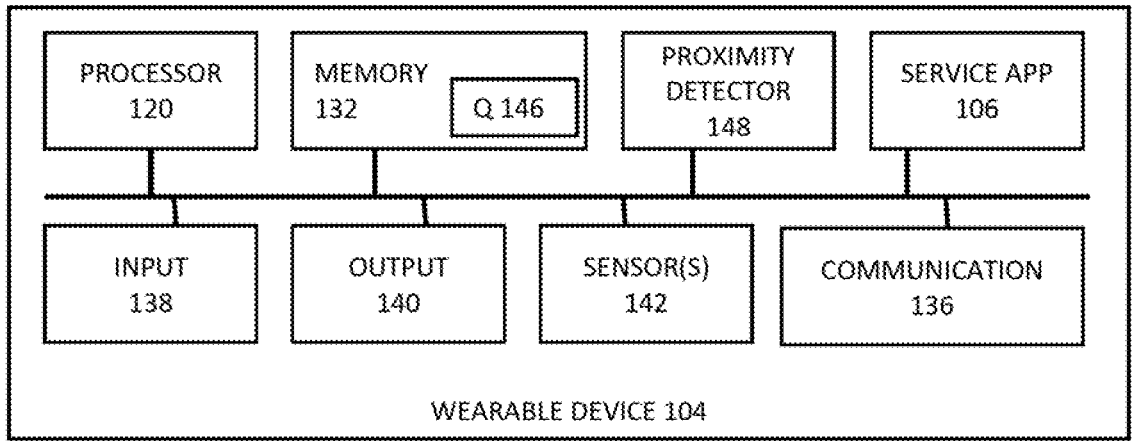
FIG. 6 is a block diagram illustrating a high-level architecture of a wearable device, according to some embodiments of the disclosure.

FIG. 6 is a block diagram illustrating a high-level architecture of a wearable device, according to some embodiments of the disclosure. This example shown supplements the wearable device 104 of FIG. 1B. Specifically, the memory 132 can be provided with a queue 146 to allow the wearable device 104 to queue tasks that are being deferred until the wearable device is in proximity to the companion device. Moreover, the wearable device 104 can be provided with a proximity detector 148, which can actively search the surroundings of the wearable device 104 for its companion device, and/or can receive notification from the companion device when the companion device detects the wearable device 104 is in proximity to the companion device as an indication that the wearable device is in fact in proximity to the companion device. The proximity detector 148 can be implemented through, e.g., Bluetooth Low Energy, Near Field Communication channel, some other suitable wireless communication mechanism enabling proximity detection.

Figure 7:
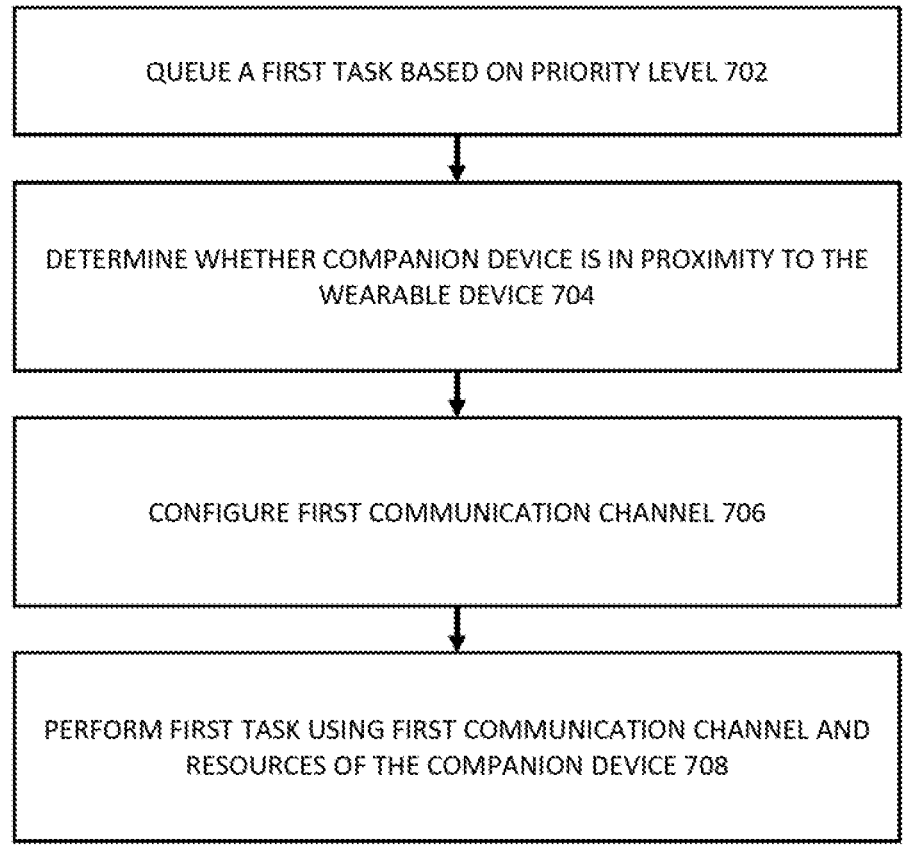
FIG. 7 is a flow diagram illustrating a method for leveraging a companion device in proximity to a wearable device to conserve resources of the wearable device, according to some embodiments of the disclosure.

FIG. 7 is a flow diagram illustrating a method for leveraging a companion device in proximity to a wearable device to conserve resources of the wearable device, according to some embodiments of the disclosure. The method includes a wearable device queuing a first task based on a priority level associated with a first task (702). The wearable device (e.g., a proximity detector 148 of FIG. 6) can determine that the companion device is in proximity to the wearable device (704). The wearable device can configure a first communication channel between the wearable device and the companion device when the companion device is in proximity to the wearable device (706), e.g., using a low energy communication channel. To intelligently conserve the resources of the wearable device, the wearable device can perform the first task using the first communication channel and one or more resources of the companion device (708).

Example

When the Wearable Device is in Proximity to a Companion Device

Figure 8:
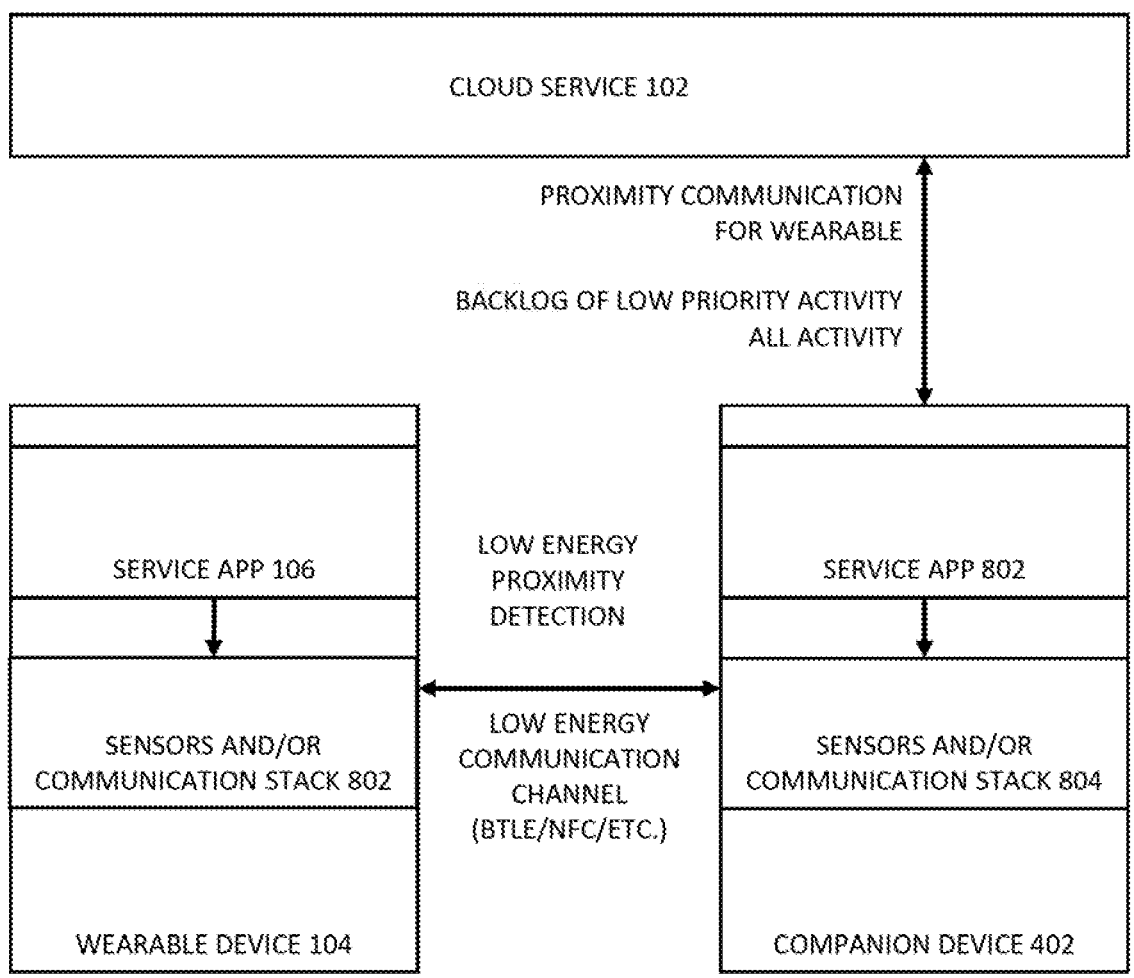
FIG. 8 is a block diagram illustrating a scenario when a wearable device is in proximity to a more capable device, according to some embodiments of the disclosure.

FIG. 8 is a block diagram illustrating a scenario when a wearable device is in proximity to a more capable device, according to some embodiments of the disclosure. In this scenario, both the wearable device 104 and the companion device 402 has a service application (service application 106 and service application 802). To enable queuing and prioritization of service application activities, sensors and/or communication stack (sensors and/or communication stack 802 and sensors and/or communication stack 804) are provided on both or at least one of the wearable device and the companion device. The sensors can enable either one or both of the wearable device 104 and companion device 402 to determine whether the other device is nearby. The communication stack can provide the stack for transmitting and receiving communications between any two or more of the following: the wearable device 104, the companion device 402, and the cloud service 102. Furthermore, the companion device 402 (generally having more resources) can be communicably connected to the cloud service 102 to act as a proxy for communications between the cloud service and the wearable device.

When a task has a low priority level, the wearable device 104 (e.g., using the service app 106) can queue the task. When the companion device is nearby, a backlog (queue) of low priority tasks or all tasks are performed by the companion device 402, and the companion device 402 cooperates with the wearable device 104 to complete those tasks in order to leverage the processing power and resources of the companion device 104. The following describes some examples of performing such tasks while leveraging the resources of the companion device 402.

In one example, performing of a task includes communicating with a service remote from the wearable device (e.g., the cloud service 102) and the companion device via a communication channel between the wearable device 104 and the companion device 402 and a communication channel configured between the companion device 402 and the service (e.g., the cloud service 102). Data can be communicated through a tunnel that is established between the wearable device 104 and the cloud service 102. Typically, the communication channel between the wearable device 104 and the companion device 402 is a low energy communication channel, e.g., Bluetooth Low Energy, a near field communication channel, and any suitable wireless communication channel. The communication channel between the companion device 402 be provisioned over a cellular network, the Internet, and/or an Intranet, and may consume more power, be more capable, and/or have higher bandwidth than the communication channel between the wearable device 104 and the companion device 402.

In another example, performing of a task includes obtaining, by the wearable device 104, sensor data measured by the companion device 402 and/or derived data from the sensor data via a communication channel between the wearable device 104 and the companion device 402. Advantageously, the wearable device 104 can offer rich features without having to physically include the sensors offered by the companion device 402 and/or consume computational resources or power of the wearable device 104 to make measurements using those sensors. The sensor data and/or the derived data can enrich the service application 106 of wearable device 104.

In yet another example, performing of a task includes triggering, by the wearable device 104, a computation task to be performed using resources of the companion device 402 to generate a result. For instance, the wearable device 104 can transmit a batch of data to the companion device 402 and requests the companion device 402 to process the batch of data to generate derived data. Optionally, the wearable device 104 can receive the result of the computation task from the companion device 402 over the communication channel between the wearable device 104 and the companion device 402. Advantageously, the wearable device 402 can request the companion device 402 to perform computationally expensive tasks (e.g., processing or filtering data on behalf of the wearable device 104), without having to consume significant computational resources and/or power of the wearable device 104.

Example

When the Wearable Device is not Proximity to a Companion Device

Figure 9:
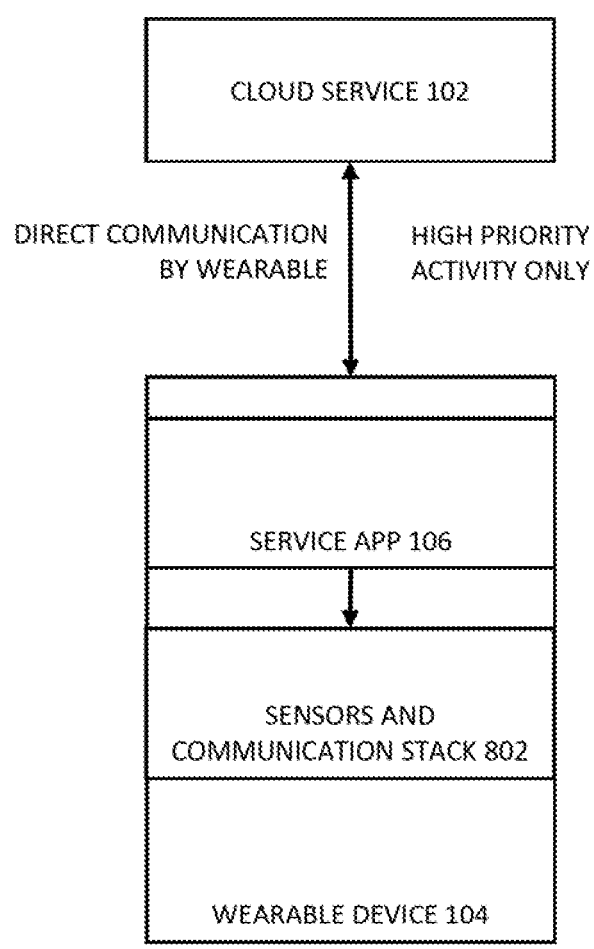
FIG. 9 is a block diagram illustrating a scenario when a wearable device is not in proximity to a more capable device, according to some embodiments of the disclosure.

FIG. 9 is a block diagram illustrating a scenario when a wearable device is not in proximity to a more capable device, according to some embodiments of the disclosure. In this scenario, the wearable device 104 has a (direct) communication channel with the cloud service 102 for communicating and completing high priority activity only (when the companion device is not nearby or in proximity to the wearable device 104). In such scenarios, the wearable device 104 can perform a task based on a priority level associated with the task, when the companion device is not in proximity to the wearable device. For example, if the task has a high priority level, the wearable device 104 does not queue the task, and can perform the task without significant delay. A task with a high priority level can be associated with associated with one or more of following: emergency communication, priority communication, and (certain) communication with a service remote from the wearable device.

In some cases, the wearable device 104 is configured to process incoming requests from the cloud service 102 requesting the wearable device 104 perform a task (e.g., display information, output notifications, generate data in response to the request, etc.). The wearable device 104 can determine the priority level based on metadata that is provided with the request. In some cases, the metadata includes a priority level. In some cases, the metadata includes an identifier that is usable by the wearable device 104 to determine a priority level associated with the request. Based on the priority level, the wearable device 104 can determine whether to queue or not to queue the task being requested by the incoming request.

Other Embodiments and System Illustrations

Note that with the examples provided herein, interaction may be described in terms of two, three, or more computing devices. However, this has been done for purposes of clarity and example only. In certain cases, it may be easier to describe one or more of the functionalities of a given set of flows by only referencing a limited number of computing devices. Moreover, the wearable and companion systems are readily scalable and can be implemented across a large number of components, as well as more complicated/sophisticated arrangements and configurations. Accordingly, the examples provided should not limit the scope or inhibit the broad teachings of wearable and companion systems as potentially applied to a myriad of other architectures.

It is also important to note that the functions related to wearable and companion systems as disclosed herein, illustrate only some of the possible wearable and companion systems functions that may be executed by, or within, systems illustrated in the FIGS. 1A-B, 2-4, 6, 8 and 9. Some of these operations (e.g., in relation to all the FIGURES) may be deleted or removed where appropriate, or these operations may be modified or changed considerably without departing from the scope of the present disclosure. In addition, the timing of these operations may be altered considerably. The preceding operational flows have been offered for purposes of example and discussion. Substantial flexibility is provided by embodiments described herein in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. Additionally, although systems in FIGS. 1A-B, 2-4, 6, 8 and Shave been illustrated with reference to particular elements and operations that facilitate the functions of the wearable and companion systems, these elements and operations may be replaced by any suitable architecture, protocols, and/or processes that achieve the intended functionality of the wearable and companion systems.

In one example implementation, various devices or components involved in implementing the embodiments described herein can include software for achieving the described functions, and these devices or components disclosed herein may comprise software embodied in one or more non-transitory, tangible media for facilitating the activities described herein. At least a part of the systems and devices (e.g., wearable device, service application, sensors, communication stack, companion device, cloud service, management console (could also be referred to a "configuration console"), proximity detector, and any components shown in FIGS. 1A-B, 2-4, 6, 8 and 9 for enabling wearable and companion systems) disclosed herein may also include a memory device (or memory element) for storing information to be used in achieving the functions as outlined herein. Additionally, the systems and devices (e.g., wearable device, service application, sensors, communication stack, companion device, cloud service, management console (could also be referred to a "configuration console"), proximity detector, and any components shown in FIGS. 1, 4-6 for enabling wearable and companion systems) described herein may include one or more processors that is capable of executing software or an algorithm to perform the functions as discussed in this Specification. These devices may further keep information in any suitable memory element (random access memory ("RAM"), ROM, EPROM, EEPROM, ASIC, etc.), software, hardware, or in any other suitable component, device, element, or object where appropriate and based on particular needs. For instance, the memory element can include a queue for deferred tasks. Any of the memory items discussed herein should be construed as being encompassed within the broad term "memory element." Similarly, any of the potential processing elements, modules, and machines described in this Specification should be construed as being encompassed within the broad term "processor." Each of the network elements can also include suitable interfaces for receiving, transmitting, and/or otherwise communicating data or information in a network environment.

Note that in certain example implementations, the functions outlined herein and in any of the figures/drawings included herein may be implemented by logic encoded in one or more tangible media (e.g., embedded logic provided in an application specific integrated circuit ("ASIC"), digital signal processor ("DSP") instructions, software (potentially inclusive of object code and source code) to be executed by a processor, or other similar machine, etc.). In some of these instances, a memory element is provided to store data used for the operations described herein. This includes the memory element being able to store software, logic, code, or processor instructions that are executed to carry out the activities described in this Specification. A processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array ("FPGA"), an erasable programmable read only memory ("EPROM"), an electrically erasable programmable ROM ("EEPROM")) or an ASIC that includes digital logic, software, code, electronic instructions, or any suitable combination thereof.

Program instructions may be used to cause a general-purpose or special-purpose processing system that is programmed with the instructions to perform the operations described herein. Alternatively, the operations may be performed by specific hardware components that contain hardwired logic for performing the operations, or by any combination of programmed computer components and custom hardware components. The methods described herein may be provided as a computer program product that may include one or more non-transitory, tangible, machine readable media having stored thereon instructions that may be used to program a processing system or other electronic device to perform the methods. The term "machine readable medium" used herein shall include any medium that is capable of storing or encoding a sequence of instructions for execution by the machine and that cause the machine to perform any one of the methods described herein. The term "non-transitory machine readable medium" shall accordingly include, but not be limited to, memories such as solid-state memories, optical and magnetic disks. Furthermore, it is common in the art to speak of software, in one form or another (e.g., program, procedure, process, application, module, logic, and so on) as taking an action or causing a result. Such expressions are merely a shorthand way of stating that the execution of the software by a processing system causes the processor to perform an action or produce a result.

It should be noted that some of the infrastructure discussed herein (e.g., cloud service, management console (could also be referred to a "configuration console"), and any components shown in FIGS. 1A-B, 2-4, 6, 8 and 9 for enabling wearable and companion systems) can be provisioned as part of any type of network element. In particular, the infrastructure can facilitate management and configuration of wearable devices with companion devices, and/or provide services subscribed by the wearable device and/or companion device. As used herein, the terms e.g., cloud service, management console (could also be referred to a "configuration console"), and any components shown in FIGS. 1A-B, 2-4, 6, 8 and 9 for enabling wearable and companion systems can encompass computers, servers, network appliances, hosts, routers, switches, gateways, bridges, virtual equipment, load-balancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

In one implementation, networked elements/devices (e.g., wearable device, service app, sensors, communication stack, companion device, cloud service, management console (could also be referred to a "configuration console"), and any components shown in FIGS. 1A-B, 2-4, 6, 8 and 9 for enabling wearable and companion systems having network connectivity or communication channel with another component) can include software to achieve (or to foster) the concept of wearable and companion systems. This could include the implementation of instances of any of the components, engines, logic, etc. shown in the diagrams included herein. Additionally, each of these devices can have an internal structure (e.g., a processor, a memory element, etc.) to facilitate some of the operations described herein. In other embodiments, these management activities may be executed externally to these devices, or included in some other network element to achieve the intended functionality. Alternatively, these network devices may include software (or reciprocating software) that can coordinate with other network elements in order to achieve the wearable and companion systems described herein. In still other embodiments, one or several devices may include any suitable algorithms, hardware, software, components, modules, interfaces, or objects that facilitate the operations thereof.

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that topologies illustrated in and described with reference to the figures/drawings included herein (and their teachings) are readily scalable and can accommodate a large number of components, as well as more complicated/sophisticated arrangements and configurations. Accordingly, the examples provided should not limit the scope or inhibit the broad teachings of the illustrated topologies as potentially applied to a myriad of other architectures.

It is also important to note that the steps in the preceding flow diagrams (e.g., shown in FIGS. 5 and 7) illustrate only some of the possible signalling scenarios and patterns that may be executed by, or within, communication systems shown in the figures/drawings included herein. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication systems shown in the figures/drawings in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges, embodiments described herein may be applicable to other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

In accordance with the well-established principle that an "applicant is entitled to be his or her own lexicographer," MPEP 2111.01(IV), citing In re Paulson, 30 F.3d 1475, 1480 (Fed. Cir. 1994), certain terms have been expressly defined herein. It is expressly intended that those terms have the definitions supplied, and that they not be given any interpretation inconsistent with those definitions.

Examples

AA: Configuring a wearable device comprises the one or more of processes outlined in the description for FIGS. 2 and 3 using the system shown in FIG. 1, where the steps are performed by one or more of the following: the wearable device, service app, management console, cloud service, and the user.

AB: A system implementing AA can optionally include a companion device which can proxy communications which occurred between the service application and the cloud service in FIGS. 2 and 3, such that the service application communicates with the cloud service through the companion device instead of directly with the cloud service. The companion device may serve the functions of the management console shown in FIGS. 2 and 3.

BA: Performing service application activities of a wearable device while leveraging a companion device having more computing resources than the wearable device comprises one or more of the processes outlined in the description for FIGS. 4-6.

BB: A system implementing BA can optionally include sensors provided on either the wearable device or the companion device to detect whether the companion device is in proximity to the wearable device (or vice versa). Communication stack is provided to maintain communications (e.g., a queue) between the wearable device and the companion device.

BC: Performing service application activities in BA can optionally include prioritizing service application activities, performing low priority activities using the wearable device when the companion device is nearby the wearable device; and using the companion device as a proxy. In such a case the companion device may actually perform the activities on behalf of the wearable device.

BD: Performing service application activities in BA or BC can optionally include performing high priority activities using the wearable device and not using the companion device as a proxy.

Example 1 is a wearable device (or broadly, an apparatus), comprising: a memory element operable to store electronic code; and a processor operable to execute instructions associated with the electronic code, said instructions for leveraging a companion device in proximity to a wearable device to conserve resources of the wearable device, such that the wearable device is configured to queue a first task based on a priority level associated with a first task, determine that the companion device is in proximity to the wearable device, configure a first communication channel between the wearable device and the companion device when the companion device is in proximity to the wearable device, and perform the first task using the first communication channel and one or more resources of the companion device.

In Example 2, the wearable device of Example 1 can optionally include the wearable device having one or more of the following characteristics when compared with the companion device: fewer computing resources, fewer communication or network resources, fewer power resources, and fewer user input methods.

In Example 3, the wearable device of any one of Examples 1-2 can optionally include the first task having a low priority level.

In Example 4, the wearable device of any one of Examples 1-3 can optionally include performing of the first task comprising: communicating with a service remote from the wearable device and the companion device via the first communication channel and a second communication channel configured between the companion device and the service.

In Example 5, the wearable device of any one of Examples 1-4 can optionally include the first communication channel being a near field communication channel and/or a wireless communication channel.

In Example 6, the wearable device of any one of Examples 1-5 can optionally include performing of the first task comprising: obtaining sensor data measured by the companion device and/or derived data from the sensor data via the first communication channel.

In Example 7, the wearable device of any one of Examples 1-6 can optionally include performing the first task comprising: triggering a computation task to be performed using resources of the companion device to generate a result; and receiving the result of the computation task from the companion device over the first communication channel.

In Example 8, the wearable device of any one of Examples 1-7 can optionally include the wearable device being further configured to: perform a second task based on a priority level associated with the second task, when the companion device is not in proximity to the wearable device.

In Example 9, the wearable device of Examples 8 can optionally include the second task having a high priority level.

In Example 10, the wearable device of any one of Examples 8 or 9 can optionally include the second task being associated with one or more of following: emergency communication, priority communication, and communication with a service remote from the wearable device.

In Example 11, the wearable device of any one of Examples 1-10 can optionally include the wearable device being further configured to: transmit a registration request to a service remote from the wearable device; in response to transmitting the registration request, receive a token generated by the service over a message channel between the wearable device and the service, wherein the message channel is mapped to the token, and the token has a limited time to live; output, by an output of the wearable device, the token to a user; and after the user provides the token to a management console in communication with the service, receive a message from the service over the message channel indicating that the registration request is complete.

In Example 12, the wearable device of any one of Examples 1-10 can optionally include the wearable device being further configured to: receive a token generated by a service remote from the wearable device in a text or multimedia message, wherein the token has a limited time to live, and the text or multimedia message is transmitted using an identifier of the wearable device; output, by an output of the wearable device, the token to a user; and after the user inputs the token at a management console in communication with the service, receive a message from the service over a message channel between the wearable device and the service, wherein the message channel is mapped to the token, and the message indicates that the registration request is complete.

In Example 13, the wearable device of any one of Examples 1-10 can optionally include the wearable device being further configured to: transmit a registration request to the companion device; in response to transmitting the registration request, receive, by the wearable device, a token generated by the service via a message channel between the wearable device and the companion device, wherein the message channel is mapped to the token, and the token has a limited time to live; output, by an output of the wearable device, the token to a user; and after the user provides the token to a management console of the companion device, receive a message from the companion device over the message channel indicating that the registration request is complete.

In Example 14, the wearable device of any one of Examples 1-13 can optionally include the wearable device being a computing system.

Example 15 is an apparatus for leveraging a companion device in proximity to a wearable device to conserve resources of the wearable device, comprising: (means for storing electronic code) means for queuing a first task based on a priority level associated with a first task; means for determining that the companion device is in proximity to the wearable device; means for configuring a first communication channel between the wearable device and the companion device when the companion device is in proximity to the wearable device; and means for performing the first task using the first communication channel and one or more resources of the companion device.

In Example 16, the apparatus of Example 13 can optionally include the wearable device having one or more of the following characteristics when compared with the companion device: fewer computing resources, fewer communication or network resources, fewer power resources, and fewer user input methods.

In Example 17, the apparatus of any one of Examples 15-16 can optionally include the first task having a low priority level.

In Example 18, the apparatus of any one of Examples 15-17 can optionally include the means for performing of the first task comprising: means for communicating with a service remote from the wearable device and the companion device via the first communication channel and a second communication channel configured between the companion device and the service.

In Example 19, the apparatus of any one of Examples 15-18 can optionally include the first communication channel being a near field communication channel and/or a wireless communication channel.

In Example 20, the apparatus of any one of Examples 15-19 can optionally include the means for performing of the first task comprising: means for obtaining sensor data measured by the companion device and/or derived data from the sensor data via the first communication channel.

In Example 21, the apparatus of any one of Examples 15-20 can optionally include the means for performing the first task comprising: means for triggering a computation task to be performed using resources of the companion device to generate a result; and means for receiving the result of the computation task from the companion device over the first communication channel.

In Example 22, the apparatus of any one of Examples 15-21 can optionally include: means for performing a second task based on a priority level associated with the second task, when the companion device is not in proximity to the wearable device.

In Example 23, the apparatus of any one of Examples 22 can optionally include the second task having a high priority level.

In Example 24, the apparatus of any one of Examples 22 or 23 can optionally include the second task being associated with one or more of following: emergency communication, priority communication, and communication with a service remote from the wearable device.

In Example 25, the apparatus of any one of Examples 15-24, can optionally include: means for transmitting a registration request to a service remote from the wearable device; means for, in response to transmitting the registration request, receiving a token generated by the service over a message channel between the wearable device and the service, wherein the message channel is mapped to the token, and the token has a limited time to live; means for outputting, by an output of the wearable device, the token to a user; and means for, after the user provides the token to a management console in communication with the service, receiving a message from the service over the message channel indicating that the registration request is complete.

In Example 26, the apparatus of any one of Examples 15-24 can optionally include: means for receiving a token generated by a service remote from the wearable device in a text or multimedia message, wherein the token has a limited time to live, and the text or multimedia message is transmitted using an identifier of the wearable device; means for outputting, by an output of the wearable device, the token to a user; and means for, after the user inputs the token at a management console in communication with the service, receiving a message from the service over a message channel between the wearable device and the service, wherein the message channel is mapped to the token, and the message indicates that the registration request is complete.

In Example 27, the apparatus of any one of Examples 15-24 can optionally include: means for transmitting a registration request to the companion device; means for, in response to transmitting the registration request, receiving, by the wearable device, a token generated by the service via a message channel between the wearable device and the companion device, wherein the message channel is mapped to the token, and the token has a limited time to live; means for outputting, by an output of the wearable device, the token to a user; and means for, after the user provides the token to a management console of the companion device, receiving a message from the companion device over the message channel indicating that the registration request is complete.

In Example 28, the apparatus of any one of Examples 15-27 can optionally include the apparatus being a computing system.

Example 29 is a method for leveraging a companion device in proximity to a wearable device to conserve resources of the wearable device, comprising: queuing, by a wearable device, a first task based on a priority level associated with a first task; determining that the companion device is in proximity to the wearable device; configuring a first communication channel between the wearable device and the companion device when the companion device is in proximity to the wearable device; and performing the first task using the first communication channel and one or more resources of the companion device.

In Example 30, the method of Example 29 can optionally include the wearable device having one or more of the following characteristics when compared with the companion device: fewer computing resources, fewer communication or network resources, fewer power resources, and fewer user input methods.

In Example 31, the method of Example 29 or 30 can optionally include the first task having a low priority level.

In Example 32, the method of any one of Examples 29-31 can optionally include performing the first task comprising: communicating with a service remote from the wearable device and the companion device via the first communication channel and a second communication channel configured between the companion device and the service.

In Example 33, the method of any one of Examples 29-32 can optionally include the first communication channel being a near field communication channel and/or a wireless communication channel.

In Example 34, the method of any one of Examples 29-33 can optionally include performing the first task comprising: obtaining sensor data measured by the companion device and/or derived data from the sensor data via the first communication channel.

In Example 35, the method of any one of Examples 29-34 can optionally include performing the first task comprising: triggering a computation task to be performed using resources of the companion device to generate a result; and receiving the result of the computation task from the companion device over the first communication channel.

In Example 36, the method of any one of Examples 29-35 can optionally include performing a second task based on a priority level associated with the second task, when the companion device is not in proximity to the wearable device.

In Example 37, the method of Example 36 can optionally include the second task having a high priority level.

In Example 38, the method of Example 36 or 37 can optionally include the second task being associated with one or more of following: emergency communication, priority communication, and communication with a service remote from the wearable device.

In Example 39, the method of any one of Examples 29-38 can optionally include: transmitting a registration request to a service remote from the wearable device; in response to transmitting the registration request, receiving a token generated by the service over a message channel between the wearable device and the service, wherein the message channel is mapped to the token, and the token has a limited time to live; outputting, by an output of the wearable device, the token to a user; after the user provides the token to a management console in communication with the service, receiving a message from the service over the message channel indicating that the registration request is complete.

In Example 40, the method of any one of Examples 29-38 can optionally include: receiving a token generated by a service remote from the wearable device in a text or multimedia message, wherein the token has a limited time to live, and the text or multimedia message is transmitted using an identifier of the wearable device; outputting, by an output of the wearable device, the token to a user; and after the user inputs the token at a management console in communication with the service, receiving a message from the service over a message channel between the wearable device and the service, wherein the message channel is mapped to the token, and the message indicates that the registration request is complete.

In Example 41, the method of any one of Examples 29-38 can optionally include: transmitting a registration request to the companion device; in response to transmitting the registration request, receiving, by the wearable device, a token generated by the service via a message channel between the wearable device and the companion device, wherein the message channel is mapped to the token, and the token has a limited time to live; outputting, by an output of the wearable device, the token to a user; and after the user provides the token to a management console of the companion device, receiving a message from the companion device over the message channel indicating that the registration request is complete.

Example 42 is one or more machine-readable media including code that, when executed, causes a machine to perform the method of any one of claims 29-41.

Example 43 is an apparatus comprising means for performing the method of any one of claims 29-41.

In Example 44, the apparatus of claim 43 can optionally include the means for performing the method comprising a processor and a memory.

In Example 45, the apparatus of claim 43 can optionally include the memory comprising machine-readable instructions that, when executed, cause the apparatus to perform the method of any one of claims 29-41.

In Example 46, the apparatus of any one of claims 43-45 can optionally include the apparatus being a computing system.

Example 47 is at least one computer-readable media comprising instructions that, when executed, implement the method of any one of claims 29-41 or realize the apparatus of any one of claims 43-46.

Example 48. One or more non-transitory, tangible, computer-readable storage media encoded with instructions that, when executed, cause one or more processing units to perform operations for leveraging a companion device in proximity to a wearable device to conserve resources of the wearable device, wherein the operations comprise: queuing, by a wearable device, a first task based on a priority level associated with a first task; determining that the companion device is in proximity to the wearable device; configuring a first communication channel between the wearable device and the companion device when the companion device is in proximity to the wearable device; and performing the first task using the first communication channel and one or more resources of the companion device.

In Example 49, the media of Example 48 can optionally include the wearable device having one or more of the following characteristics when compared with the companion device: fewer computing resources, fewer communication or network resources, fewer power resources, and fewer user input methods.

In Example 50, the media of Example 48 or 49 can optionally include the first task having a low priority level.

In Example 51, the media of any one of Examples 48-50 can optionally include performing the first task comprising: communicating with a service remote from the wearable device and the companion device via the first communication channel and a second communication channel configured between the companion device and the service.

In Example 52, the media of any one of Examples 48-51 can optionally include the first communication channel being a near field communication channel and/or a wireless communication channel.

In Example 53, the media of any one of Examples 48-52 can optionally include performing the first task comprising: obtaining sensor data measured by the companion device and/or derived data from the sensor data via the first communication channel.

In Example 54, the method of any one of Examples 48-53 can optionally include performing the first task comprising: triggering a computation task to be performed using resources of the companion device to generate a result; and receiving the result of the computation task from the companion device over the first communication channel.

In Example 55, the media of any one of Examples 48-54 can optionally include the operations comprising performing a second task based on a priority level associated with the second task, when the companion device is not in proximity to the wearable device.

In Example 56, the media of Example 55 can optionally include the second task having a high priority level.

In Example 57, the media of Example 55 or 56 can optionally include the second task being associated with one or more of following: emergency communication, priority communication, and communication with a service remote from the wearable device.

In Example 58, the media of any one of Examples 48-57 can optionally include the operations comprising: transmitting a registration request to a service remote from the wearable device; in response to transmitting the registration request, receiving a token generated by the service over a message channel between the wearable device and the service, wherein the message channel is mapped to the token, and the token has a limited time to live; outputting, by an output of the wearable device, the token to a user; after the user provides the token to a management console in communication with the service, receiving a message from the service over the message channel indicating that the registration request is complete.

In Example 59, the media of any one of Examples 48-57 can optionally include the operations comprising: receiving a token generated by a service remote from the wearable device in a text or multimedia message, wherein the token has a limited time to live, and the text or multimedia message is transmitted using an identifier of the wearable device; outputting, by an output of the wearable device, the token to a user; and after the user inputs the token at a management console in communication with the service, receiving a message from the service over a message channel between the wearable device and the service, wherein the message channel is mapped to the token, and the message indicates that the registration request is complete.

In Example 59, the media of any one of Examples 48-57 can optionally include the operations comprising: transmitting a registration request to the companion device; in response to transmitting the registration request, receiving, by the wearable device, a token generated by the service via a message channel between the wearable device and the companion device, wherein the message channel is mapped to the token, and the token has a limited time to live; outputting, by an output of the wearable device, the token to a user; and after the user provides the token to a management console of the companion device, receiving a message from the companion device over the message channel indicating that the registration request is complete.

The invention claimed is:

1. A wearable device, comprising:
a memory element operable to store electronic code; and
a processor operable to execute instructions associated with the electronic code, said instructions for leveraging a companion device when in proximity to the wearable device to conserve resources of the wearable device, such that the wearable device is configured to
receive a token from the companion device via a message channel between the wearable device and the companion device, wherein the message channel is Bluetooth or Near Field Communication (NFC);
output the token via a display, a haptic output, or a speaker, the token having a limited time to live;
configure a push message channel mapped to the token;
receive a configuration of the wearable device over the push message channel;
receive a request to perform a task;
receive metadata with the request;
determine a priority level associated with the request, based on the metadata;
perform the task, if the priority level is high;
queue the task, if the priority level is low;
determine that the companion device is in proximity to the wearable device;
configure the message channel between the wearable device and the companion device when the companion device is in proximity to the wearable device; and
perform the task using the message channel and one or more resources of the companion device.

2. The wearable device of claim 1, further comprising:
a proximity detector configured to receive a notification from the companion device, wherein the proximity detector is implemented through Bluetooth Low Energy or a Near Field Communication channel, and the task is performed using the message channel and the one or more resources of the companion device, based on a determination that the companion device is in proximity to the wearable device.

3. The wearable device of claim 1, wherein the message channel is a low energy communication channel.

4. The wearable device of claim 1, wherein the request to perform the task is received from a cloud service.

5. One or more non-transitory, tangible, computer-readable storage media encoded with instructions that, when executed, cause one or more processing units to perform operations for leveraging a companion device when in proximity to a wearable device to conserve resources of the wearable device, wherein the operations comprise:
receiving a token from the companion device via a message channel between the wearable device and the companion device, wherein the message channel is Bluetooth or Near Field Communication (NFC);
outputting the token via a display, a haptic output, or a speaker of the wearable device, the token having a limited time to live;
configuring a push message channel mapped to the token;
receiving a configuration of the wearable device over the push message channel;
receiving a request to perform a task;
receiving metadata with the request;
determining a priority level associated with the request, based on the metadata;
performing the task, if the priority level is high;
queueing, by the wearable device, the task, if the priority level is low;
determining that the companion device is in proximity to the wearable device;
configuring the message channel between the wearable device and the companion device when the companion device is in proximity to the wearable device; and
performing the task using the message channel and one or more resources of the companion device.

6. The media of claim 5, wherein the operations further comprise:
receiving a notification from the companion device with a proximity detector, wherein the proximity detector is implemented through Bluetooth Low Energy or a Near Field Communication channel, and the task is performed using the message channel and the one or more resources of the companion device, based on a determination that the companion device is in proximity to the wearable device.

7. The media of claim 5, wherein the message channel is a low energy communication channel.

8. The media of claim 5, wherein the request to perform the task is received from a cloud service.

9. A method for leveraging a companion device when in proximity to a wearable device to conserve resources of the wearable device, comprising:
- receiving a token from the companion device via a message channel between the wearable device and the companion device, wherein the message channel is Bluetooth or Near Field Communication (NFC);
- outputting the token via a display, a haptic output, or a speaker of the wearable device, the token having a limited time to live;
- configuring a push message channel mapped to the token;
- receiving a configuration of the wearable device over the push message channel;
- receiving a request to perform a task;
- receiving metadata with the request;
- determining a priority level associated with the request, based on the metadata;
- performing the task, if the priority level is high;
- queueing, by the wearable device, the task, if the priority level is low;
- determining that the companion device is in proximity to the wearable device;
- configuring the message channel between the wearable device and the companion device when the companion device is in proximity to the wearable device; and
- performing the task using the message channel and one or more resources of the companion device.

10. The method of claim 9, further comprising:
receiving the token at a management console in communication with a service remote from the wearable device.

11. The method of claim 9, further comprising:
receiving a notification from the companion device with a proximity detector implemented through Bluetooth Low Energy or a Near Field Communication channel, wherein the task is performed using the message channel and the one or more resources of the companion device, based on a determination that the companion device is in proximity to the wearable device.

12. The method of claim 9, wherein the message channel is a low energy communication channel.

13. The method of claim 9, wherein the request to perform the task is received from a cloud service.

* * * * *

UNITED STATES PATENT AND TRADEMARK OFFICE
CERTIFICATE OF CORRECTION

PATENT NO.       : 10,891,155 B2                                Page 1 of 1
APPLICATION NO.  : 15/100492
DATED            : January 12, 2021
INVENTOR(S)      : Dattatraya Kulkarni et al.

It is certified that error appears in the above-identified patent and that said Letters Patent is hereby corrected as shown below:

In the Drawings

On Sheet 7 of 8 (FIG. 8), delete "PROXMITY" and insert -- PROXIMITY --, therefor.

On Sheet 8 of 8 (FIG. 9), delete "PROXMITY" and insert -- PROXIMITY --, therefor.

Signed and Sealed this
Ninth Day of March, 2021

Drew Hirshfeld
*Performing the Functions and Duties of the*
*Under Secretary of Commerce for Intellectual Property and*
*Director of the United States Patent and Trademark Office*